Patented Sept. 26, 1922.

1,430,061

UNITED STATES PATENT OFFICE.

HIRAM C. J. DEEKS, OF SEA CLIFF, NEW YORK, ASSIGNOR TO AMERICAN RAYLO CORPORATION, OF NEW YORK, N. Y., A CORPORATION OF DELAWARE.

COLOR PHOTOGRAPHY.

No Drawing. Original application filed June 25, 1914, Serial No. 847,298. Renewed November 9, 1920, Serial No. 422,969. Divided and this application filed November 7, 1916, Serial No. 129,934. Renewed April 9, 1921. Serial No. 459,979.

*To all whom it may concern:*

Be it known that I, HIRAM C. J. DEEKS, a citizen of the United States, and formerly a resident of Sea Cliff, Long Island, in the county of Nassau and State of New York, but now a resident of Newark, in the county of Essex and State of New Jersey, have invented an Improvement in Color Photography, of which the following is a specification.

This application is a division of my prior application filed June 25, 1914, Serial No. 847,298, renewed November 9, 1920, Serial No. 422,969.

This invention relates more particularly to the pigments, and the emulsions containing the same, which are applied to coat the "color sheets" used in color photography, and particularly used in my process disclosed in said earlier applications.

These pigments were devised with the object of having the coloring matter impervious to (and therefore unaffected by) the solutions or baths employed during the earlier stages of the process but nevertheless capable of being dissolved in or otherwise acted upon by a suitable agent at a later stage of the process. My idea comprehended the use of pigments which would have all the advantages of insolubility, as in ordinary carbon printing, but which, unlike the pigments employed in carbon printing, would yield to solubility or some equivalent action for extracting the color at the proper time and under the proper agency.

In this way, if I were working, say, in monochrome, I could make a positive in accordance with the usual carbon process (modified by the use of my pigments) until I came to transferring the picture to its permanent back; then, instead of transferring the positive film containing the color, I could substitute the much simpler step of extracting the color from said film by placing it in contact with another film or surface and printing the picture thereon by contact. And if I were working in three colors, as in trichromatic photography, I could do away with all dyeing or tinting of the positive films on the one hand and with the transfer and superposing of said films on the other.

In seeking to realize this desideratum, I discovered that by compounding a pigment of dyestuff with resinous or equivalent material, such as gum, the latter would serve as a protective vehicle for the dyestuff, carrying it through all the manipulations of making the positive without allowing it to dissolve in or be affected by any of the usual (water) baths employed but capable of yielding, at the proper time, to the action of a suitable solvent or other agent and thus of imparting its color to a permanent support by contact.

One mode of carrying out my invention is to dissolve a dyestuff together with gum sandarac in alcohol and to spray the solution thus formed into a closed chamber whereby the solvent may be evaporated and the residue deposited upon the floor of the chamber as a fine powder. The latter is then collected and washed (preferably in a filter press) after which it may be conveniently stored as a paste ready for use.

The depth of color will obviously depend upon the relative proportions of the dyestuff and gum employed; and for three-color work I may use one part of dyestuff to sixteen parts of gum, dissolving the dyestuff and gum in about ninety-six parts of alcohol before the spraying operation. Any suitable dyestuffs may be used such as rhodamine for the magenta, a mixture of methylene blue and brilliant green for the blue and auramine for the yellow.

In using my pigments for photographic work, an emulsion is preferably made by mixing the pigment with gelatine or some other material suitable for sensitizing and printing. For three-color work, three such emulsions are made from the three differently colored pigments respectively specified above or from any suitably colored pigments derived in accordance with this invention. The gelatine is first dissolved in warm water and then the pigments are added in the proportion say of two parts of pigment to one part of gelatine. It will be understood of course that these proportions may be varied considerably.

The laying of the color-films, as well as their sensitizing, printing and developing will be understood without particular description and forms no part of the present invention, this all being accomplished, if desired, in the usual manner of carbon printing. After developing, a positive in color will be formed upon each of the color-films, these positives being respectively monochromes of the particular color employed in the film; and in three-color photographic work there will be three such monochromes which are respectively the complements of the colors used in the filter screens in making the negatives.

Each monochrome, after having been developed, is allowed to dry and is then brought into contact with the surface upon which the composite color picture is to be printed and to remain permanently; and a suitable agent is applied to each monochrome in succession to release the color. For this purpose, I have found it preferable to use a collodion film or surface and to press the monochrome positive in contact therewith after the collodion film is set but before it is thoroughly dry, suitable means being employed to secure exact registration of each positive with the collodion film in three-color work. Of course, in monochrome work, no registration is necessary.

In this way, the volatile solvent (alcohol-ether) in the collodion becomes the active agent in extracting the color from the monochrome on monochromes and transferring it to the collodion film; and where three monochromes are applied in succession and in exact registry to the same collodion film, the said solvent acts to blend thoroughly the superposed colors into their composites whereby the collodion film, after the transfer of the color, presents a large number of hues formed by the completely blended colors and which are of great clearness and brilliancy.

While I have described my pigment and color sheet in connection with a process of color photography devised by me wherein I extract the color (or some of the color) from the monochrome positives and transfer it to a collodion film, as specified in the last paragraph, my invention is not limited to such use, since it will be possible, for example, if desired, to use these pigments in the production of color photographs by other methods than are embodied in such color transfers, as, for instance, by superposing the three monochrome positives and fastening the same together to form the composite colored picture.

I claim as my invention:

1. A compound pigment for use in making colored photographs or other pictures, comprising the combination of a dyestuff soluble in water and in alcohol and a material insoluble in water but soluble in alcohol, whereby said pigment will retain its color in water solutions but will yield it when treated with alcohol or alcohol containing substances.

2. A compound pigment for use in making colored photographs or other pictures, comprising the combination of a dyestuff soluble in water and in alcohol and a resinous material insoluble in water but soluble in alcohol whereby said pigment will retain its color in water solutions but will yield it when treated with alcohol or alcohol containing substances.

3. A compound pigment for use in making colored photographs or other pictures, comprising the combination of a dyestuff, soluble in water and in alcohol, and gum sandarac.

4. A substance consisting of finely divided particles of gum insoluble in water but soluble in alcohol and containing a dyestuff soluble in water and in alcohol.

5. A substance consisting of finely divided particles of gum sandarac containing a dyestuff soluble in water and in alcohol.

6. An emulsion for use in making colored photographic prints, the same consisting of film forming material, and particles of coloring matter undissolved in said material, said coloring matter retaining its color in water solutions but yielding its color when treated with alcohol or alcohol containing substances.

7. An emulsion for use in making colored photographic prints, the same consisting of gelatine and particles containing coloring matter undissolved throughout the gelatine, said coloring matter retaining its color in water solutions but yielding it when treated with alcohol or alcohol containing substances.

8. An emulsion for use in making colored photographic prints, the same consisting of gelatine and a pigment compounded of a dyestuff soluble in water and in alcohol and a gum insoluble in water but soluble in alcohol.

9. An emulsion for use in making photographic prints, the same consisting of gelatine and gum sandarac containing a dyestuff soluble in water and in alcohol.

In testimony whereof, I have signed my name to this specification this 2nd day of November, 1916.

HIRAM C. J. DEEKS.